United States Patent [19]

Takeuchi

[11] 4,024,712
[45] May 24, 1977

[54] FLUID PRESSURE CONTROL DEVICE WITH A FLUID FAILURE ALARM FOR A VEHICLE BRAKE SYSTEM

[75] Inventor: Hiroo Takeuchi, Ueda, Japan

[73] Assignee: Nisshin Kogyo Kabushiki Kaisha, Ueda, Japan

[22] Filed: June 24, 1975

[21] Appl. No.: 589,922

[30] Foreign Application Priority Data

Nov. 15, 1974  Japan .................... 49-131796

[52] U.S. Cl. ................................ 60/535; 60/545; 60/591; 137/557
[51] Int. Cl.² .......................................... F15B 7/00
[58] Field of Search ............ 60/534, 535, 545, 561, 60/562, 582, 591; 137/495, 557, 505.41, 505.14, 505.15

[56] References Cited

UNITED STATES PATENTS

| | | | |
|---|---|---|---|
| 2,196,190 | 4/1940 | Bowen | 60/534 X |
| 3,147,046 | 9/1964 | Stelzer | 60/591 |
| 3,480,333 | 11/1969 | Stelzer | 60/534 X |
| 3,597,015 | 8/1971 | Stokes | 60/535 |
| 3,606,487 | 9/1971 | Kersting | 60/535 |
| 3,708,211 | 1/1973 | Bueler | 60/535 X |
| 3,712,683 | 1/1973 | Keady | 60/534 |
| 3,738,708 | 6/1973 | Kawaguchi | 60/591 |
| 3,938,333 | 2/1976 | Mathers | 60/534 X |

Primary Examiner—Martin P. Schwadron
Assistant Examiner—Abraham Hershkovitz

[57] ABSTRACT

A device usable in a brake system including two independent hydraulic lines extending from a dual brake master cylinder to front and rear wheel brakes, respectively. The device is arranged across the two hydraulic lines midway thereof to serve the purposes of adjusting the fluid pressure ratio between the front and rear wheel brakes with a change in ratio of the vehicle load bearing on the front wheels to that on the rear wheels thereby to maximize the overall braking efficiency particularly in hard braking operations and of enabling the brake system to operate even with some fluid leakage, possibly occurring in either of the two hydraulic lines, to brake the vehicle effectively enough while at the same time warning the driver of the fluid trouble. The essential component parts, including a number of cooperating pistons and a valve associated therewith, are accommodated in a single cylinder casing and this structure renders the whole device particularly compact in size and simple in construction.

4 Claims, 3 Drawing Figures

FLUID PRESSURE CONTROL DEVICE WITH A FLUID FAILURE ALARM FOR A VEHICLE BRAKE SYSTEM

BACKGROUND OF THE INVENTION

This invention relates generally to brake systems for automotive vehicles, of the type including two independent hydraulic lines extending from a dual type brake master cylinder to the front and rear wheel brakes, respectively, and more particularly to fluid pressure control devices usable with such type of brake system and including a hydraulic failure alarm.

SUMMARY OF THE INVENTION

An object of the invention is to provide a new and improved fluid pressure control device for a brake system of the type described, which is specially designed to ensure high driving safety and highly efficient braking operation and comprises, alarm means operable with any fluid leakage possibly occurring in either of the two hydraulic lines of the brake system to alarm the driver of such fluid leakage promptly without fail, and means for automatically adjusting the ratio of the hydraulic pressure fed to the front wheel brakes to that fed to the rear wheel brakes in accordance with the ratio of the vehicle load bearing on the front wheels to that bearing on the rear wheels in order to maximize the overall braking efficiency of the system particularly in heavy braking operation.

A specific object of the present invention is to provide a fluid pressure control device of the character described in which the fluid failure alarm means and the pressure ratio adjusting means are compactly combined to be accommodated in a common, generally cylindrical casing structure of limited size.

These and other objects, features and advantages of the present invention will become apparent from the following detailed description when read in conjunction with the accompanying drawings.

DESCRIPTION OF THE PREFERRED EMBODIMENT

Figure 1:
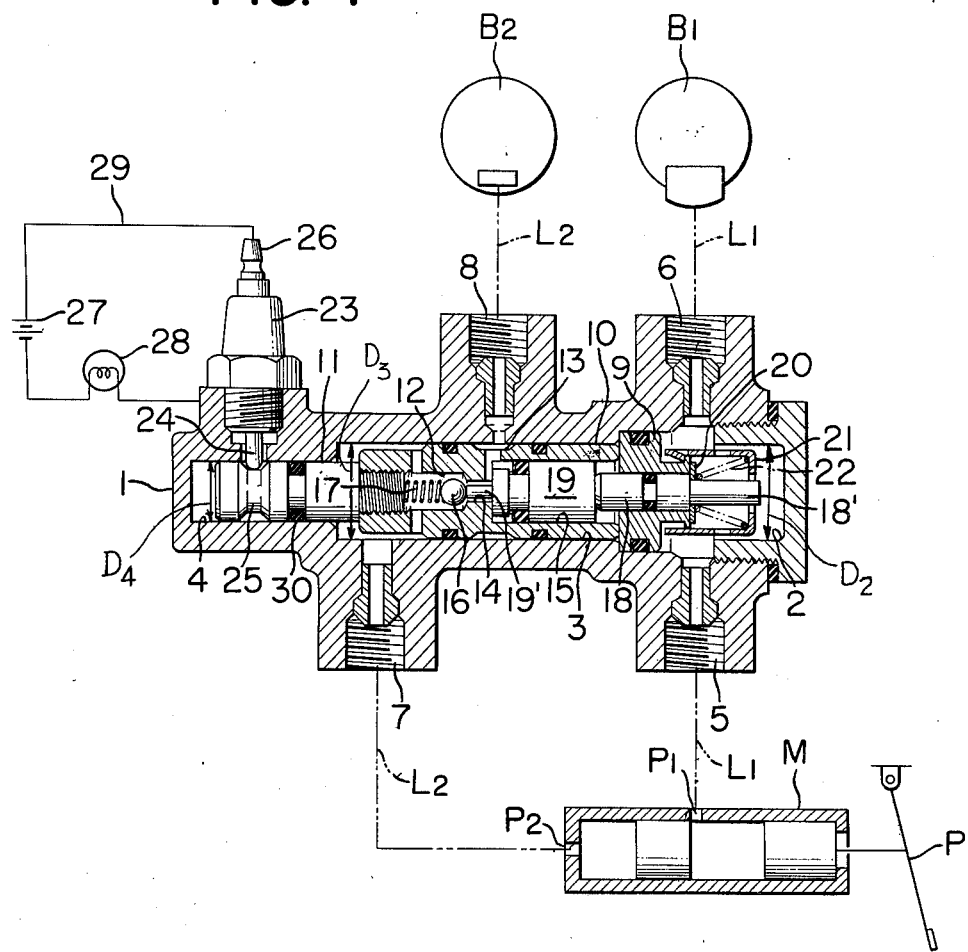
FIG. 1 is a partly schematic axial cross-sectional view illustrating a preferred embodiment of the present invention.

Referring to the drawings and first to FIG. 1, reference character M indicates a dual type brake master cylinder having first and a second output ports $P_1$ and $P_2$ and operable under the action of a pedal P to supply pressurized fluid to the exterior through the two output ports. As illustrated, the first output port $P_1$ is in fluid communication with the fluid chambers in the front wheel brakes $B_1$ by way of a first hydraulic line $L_1$ of the brake system while the second output port $P_2$ is in fluid communication with the fluid chambers in the rear wheel brakes through a second hydraulic line $L_2$, which is independent from the first hydraulic line $L_1$.

Reference numeral 1 indicates a cylinder casing forming the body of the device shown and in which casing first, second and third cylinder chambers 2, 3 and 4 are defined in alignment with each other with diameters $D_2$, $D_3$ and $D_4$ decreasing stepwise in that order. The first or rightmost cylinder chamber 2 is provided on the opposite sides thereof with a first inlet port 5 and a first fluid outlet port 6, which are connected, respectively, with the upstream and downstream sections of the first hydraulic line $L_1$. The second or middle cylinder chamber 3 is provided on the opposite sides thereof with a second fluid inlet port 7 and a second fluid outlet port 8, which are respectively connected with the upstream and downstream sections of the second hydraulic line $L_2$.

A first pressure bearing piston 9 and a second pressure bearing piston 10, which is smaller in diameter than the first piston 9, are slidably fitted in the first and second cylinder chambers 2 and 3, respectively. A switch operating piston 11, smaller in diameter than the second piston 10, is threadably engaged in the left-hand end of piston integrally therewith and slidably fitted in the third cylinder chamber 4. As shown, the right-hand end face of the first piston 9 defines in the first cylinder chamber 2 a first fluid space communicating with the first inlet and outlet ports 5 and 6 while the left-hand end face of the second piston 10 defines in the second cylinder chamber 3 a second fluid space communicating with the second inlet port 7 of the cylinder casing 1.

Formed in the second piston 10 are a valve chamber 12 communicating with the second fluid space described above, an annular groove 13 communicating with the second outlet port 8 of the cylinder casing 1 and normally also with the valve chamber 12 through a valve aperture 14, and a cylinder bore 15 opening into the first cylinder chamber 2 and normally communicating with the valve chamber 12 through the valve aperture 14. Accommodated in the valve chamber 12 are a spherical valve element 16 and a valve spring 17 normally biasing the valve element to its closed position. A first core piston 18 and a second core piston 19 are slidably fitted in the first pressure bearing piston 9 and in the cylinder bore 15 of the second pressure bearing piston 10, respectively. The first core piston 18 extends through the first pressure bearing piston 9 to project therefrom in opposite directions with the left-hand end of the first core piston 18 normally held in abutting engagement with the right-hand end of the second core piston 19. As shown, the second core piston 19 has a pusher rod 19' secured to the opposite end face thereof and extending axially therefrom into the valve aperture 14. The left extremity of the pusher rod 19' is normally extended into the valve chamber 12, as shown, with the second pressure bearing piston 10 assuming its leftmost position and is retractable out of the valve chamber 12 with rightward movement of the second pressure bearing piston 10. The first core piston 18 generally has a diameter smaller than that of the second core piston 19, as shown.

The right-hand portion 18' of the first core piston 18 is reduced in diameter relative to the left-hand portion thereof with a thrust plate 20 slidably fitted over the reduced diameter portion 18'. Seated against the thrust plate 20 is a helical pressure adjusting spring 22 which is held under compression by a spring retainer cage 21 secured to the right-hand end of the first pressure bearing piston 9.

Threadably secured to a left-hand portion of the casing body 1 is a switch unit 23 which includes a switch actuator rod 24 extending into the third cylinder chamber 4 for engagement with an annular cam groove 25 formed in the switch operating piston 11 around the periphery thereof. The switch unit 23 has a terminal 26 connected to an electrical alarm circuit 29, which includes a source of voltage 27 and an alarm lamp 28 and, as shown, connected to the casing body 1.

Reference numeral 30 indicates seal rings fitted to the respective above-described pistons around the periphery thereof and which rings each help to prevent any inadvertent movement of the associated piston, exerting thereon a frictional drag of an appropriate magnitude.

Description will next be made of the operation of the fluid pressure control device described above.

In the normal state shown in FIG. 1, the output fluid pressure fed through the first and second output ports $P_1$ and $P_2$ of the brake master cylinder M, operating under the action of pedal P, is transmitted through the first and second hydraulic lines $L_1$ and $L_2$ to the fluid chambers of the front and rear wheel brakes $B_1$ and $B_2$, respectively, to operate all the four wheel brakes since the valve aperture 14 is normally held open with the valve element 16 displaced from its seat by the pusher rod 19'.

In this situation, the first and second pressure bearing pistons 9 and 10 are subjected to a leftwardly directed and a rightwardly directed hydraulic thrust, respectively, and, since the leftward thrust is larger in magnitude than the rightward thrust due to the larger cross-sectional area of the first piston 9 relative to that of the second piston 10, the two pressure bearing pistons are held in abutting engagement with each other with the first piston 9 held in its extreme left position abutting against the left-hand end wall of the first cylinder chamber 2 or the annular shoulder defined between the first and second cylinder chambers 2 and 3, as illustrated. Such relative position of the two pistons 9 and 10 represents the neutral state of the device and, in this state, the switch actuator rod 24 of the switch unit 23 is in engagement in the annular groove 26, formed around the periphery of the switch operating piston 11, to keep open the contacts in the switch unit and thus the alarm lamp 28 remains extinguished to enable the driver to ascertain that the entire hydraulic system is in order for normal braking operation.

Figure 2:
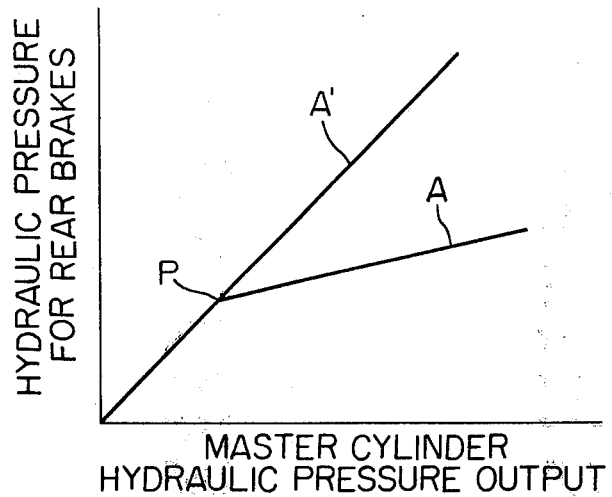
FIG. 2 is a graph representing the hydraulic pressure characteristics obtainable at the rear wheel brakes in accordance with the present invention.

Further, in this state, the first and second inner or core pistons 18 and 19 are also thrust against each other under hydraulic pressure, however, as the output fluid pressure of the brake master cylinder M and hence the fluid pressure in the valve chamber 12 and aperture 15 increases above a predetermined level, the second core piston 19, having a cross-sectional area greater than that of first core piston 18, is driven to the right together with the latter against the bias of pressure adjusting spring 22 until it is brought to a stop, abutting against the left-hand end face of the first pressure bearing piston 9. In this manner, the pusher rod 19' integral with the second core piston 19 is displaced from the valve element 16, leaving the latter in a position closing the valve aperture 14 under the bias of valve spring 17, and the rise in pressure in the downstream section of the second hydraulic line $L_2$, which is connected to the rear wheel brakes $B_2$, is temporarily interrupted, the second core piston 19 remaining in place under the fluid pressure from the downstream section of the second hydraulic line $L_2$. Subsequently, as the output pressure from the master cylinder M rises further, the leftward hydraulic thrust acting on the right-hand end face of the first core piston 18 is increased so as to move the two core pistons 18 and 19 to the left to open the valve 16 again and the hydraulic pressure in the downstream section of the second hydraulic line $L_2$ again starts to rise. With repetition of the sequential operation described above, the brake fluid pressure in the rear wheel brakes $B_2$ exhibits a characteristic as represented by the bent line A in FIG. 2. The point of inflection P is determined by the initial setting of the pressure adjusting spring 22 and the rate of pressure rise after the point of inflection P is determined by the ratio between the first and second core pistons 18 and 19 in cross-sectional area.

Figure 3:
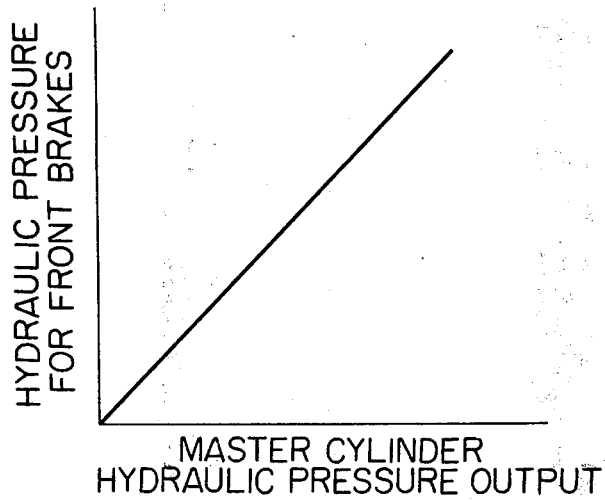
FIG. 3 is a graph which represents the hydraulic pressure characteristic obtainable at the front wheel brakes in accordance with the invention.

On the other hand, the front wheel brakes $B_1$ are directly subjected to the output fluid pressure from the brake master cylinder M; that is to say, the fluid pressure in the front wheel brakes $B_1$ is raised at the rate of increase in output fluid pressure of the brake master cylinder M, as illustrated by the straight line in FIG. 3.

Accordingly, with the device of the present invention, the front wheel brakes $B_1$ can work forcefully upon the front wheels, which are required to bear the increasing downward load when the vehicle is tilted forwardly under the effect of heavy braking operation. On the other hand, the rear wheel brakes $B_2$ work relatively lightly upon the rear wheels, which are more or less relieved of the downward load with the forward tilt of the vehicle. It will thus be appreciated that the four wheels of the vehicle can be braked as a whole with a maximized efficiency without the danger of any skidding.

Description will next be made of the braking operation obtainable with some fluid leakage possibly occurring in the first hydraulic line $L_1$ to render the front wheel brakes $B_1$ inoperable even when the brake master cylinder M is actuated. In such cases, however, as no pressure rise takes place in the first cylinder chamber 2, the second pressure bearing piston 10 is allowed to immediately move to the right together with all the other pistons under the fluid pressure from the second output port $P_2$ of the brake master cylinder M and acting on the left-hand end face of the piston 10 until the right extremity of the first core piston 18 is brought into abutting engagement with the right-hand end wall of the first cylinder chamber 2, when all of the pistons come to rest. Accordingly, the cutoff valve 16 in the second pressure bearing piston 10 remains raised by the pusher rod 19' of the second core piston 19 and the fluid pressure in the rear wheel brakes $B_2$ exhibits a straight-line characteristic as indicated at A' in FIG. 2, which corresponds to the pressure characteristic of the front wheel brakes $B_1$ shown in FIG. 3. In this manner, the rear wheel brakes $B_2$ in this case work more forcefully than usual and the rear wheels are braked with increased efficiency under the vehicle load substantially held unchanged due to inoperation of the front wheel brakes $B_1$.

In this connection, it is to be noted that, with the rightward movement of the switch operating piston 11, the switch actuator rod 24 is raised out of the annular cam groove 25 in the piston 11 to close the contacts in the switch unit 23 thereby to illuminate the alarm lamp 28 and, thus the driver is warned of the leakage trouble without delay. The switch actuator rod 24 raised out of the annular cam groove 25 remains held against the adjacent peripheral surface of the switch operating piston to keep the alarm lamp 28 illuminated even after the pedal P is released to deenergize the brake master cylinder M.

After the fluid failure in the first hydraulic line $L_1$ has been remedied, the first pressure bearing piston 9 of larger diameter is driven to the left upon operation of the brake master cylinder M forcefully under the hydraulic pressure, now existing in the first cylinder chamber 2, to restore the second pressure bearing piston 10 and other associated parts to the neutral state shown in FIG. 1 and thus the switch actuator rod 24 is allowed again to descend into engagement with the annular cam groove 25 to extinguish the alarm lamp 28.

Next, a fluid leakage is assumed to exist in the second hydraulic line $L_2$. In this case, though apparently the front wheel brakes $B_1$ operate normally upon energization of the brake master cylinder M, the first core piston 18 is moved to the left under the fluid pressure acting on the right-hand end face thereof to thrust the second pressure bearing piston 10 leftward through the medium of the second core piston 19 until the second pressure bearing piston 10 is brought to a stop in abutting engagement with the left-hand end wall of the second cylinder chamber 3. With this movement, the switch actuator rod 24 is raised out of the annular cam groove 25 so that the alarm lamp 28 is illuminated. The illuminated state of alarm lamp 28 is maintained even after deenergization of the brake master cylinder M, as with the previous case of fluid leakage on the first hydraulic line $L_1$, and, subsequently when the brake master cylinder M is again energized after the fluid failure has been remedied, the second pressure bearing piston 10 and the second core piston 19 are moved rightward together with the first core piston 18 under hydraulic pressure to restore the neutral state shown and the alarm lamp 28 is extinguished.

It will be apparent from the foregoing description that, according to the present invention, the hydraulic pressure ratio between the front and rear wheel brakes $B_1$ and $B_2$ is automatically adjusted in a hard braking operation in accordance with the ratio of the vehicle loads bearing on the front and rear wheels, respectively, to maximize the overall braking efficiency. Further, any fluid leakage possibly occurring on one or the other of the two hydraulic lines $L_1$ and $L_2$ causes operation of the alarm means such as alarm lamp 28 so that the driver is promptly warned of such fluid trouble without fail. Moreover, even in such cases, the overall braking efficiency is not impaired to any substantial extent and the driving safety is maintained as there is no controlling action causing reduction in hydraulic pressure of those brakes associated with the normally functioning hydraulic line. In addition, since such functional features are attained by cooperation of a number of piston members 9, 10, 18 and 19 which are all accommodated in a common cylinder casing 1, the device as a whole is compact in size and simple in construction and thus can readily be installed on the vehicle even where only a limited space is available.

While one preferred embodiment of the invention has been shown and described, it will be apparent to those skilled in the art that various changes and modifications may be made therein without departing from the spirit of the invention or the scope of the appended claims.

What is claimed is:

1. In a vehicle brake system of the type including two independent hydraulic lines extending from a dual type brake master cylinder to the front and rear wheel brakes, respectively, a fluid pressure control device positioned between the master cylinder and the front and rear wheel brakes, said fluid pressure control device comprising: a cylinder casing (1) defining therein a first cylinder chamber (2) and a second cylinder chamber (3) smaller in diameter than said first cylinder chamber and opening at one end into the latter in aligned relation therewith, a first pressure bearing piston (9) slidably fitted in said first cylinder chamber, a second pressure bearing piston (10) slidably fitted in said second cylinder chamber, a first core piston (18) slidably fitted in said first pressure bearing piston (9) and extending axially therethrough, a pressure adjusting spring (22) arranged between said first pressure bearing piston and said first core piston to bias the latter axially toward said second pressure bearing piston, a cylinder bore (15) formed in said second pressure bearing piston so as to open into said first cylinder chamber and having a diameter larger than that of said first core piston, means for placing said cylinder bore in fluid communication with the fluid chambers of the rear wheel brakes, a second core piston (19) slidably fitted in said cylinder bore and held in engagement with the adjacent end of said first core piston, a first fluid space defined in said first cylinder chamber (2) on the pressure bearing face of said first pressure bearing piston (9) and communicating on the one hand with one of the two output ports, ($P_1$), of the dual brake master cylinder (M) and on the other hand with the fluid chambers of the front wheel brakes ($B_1$), a second fluid space defined in said second cylinder chamber (3) on the pressure bearing face of said second pressure bearing piston (10) and communicating with the other output port ($P_2$) of the dual brake master cylinder, a fluid passage formed in said second pressure bearing piston and communicating said cylinder bore with said second fluid space, valve means arranged in said fluid passage so as to be normally held open under the bias of said pressure adjusting spring acting thereon through the medium of said first and second core pistons and switch means on said cylinder casing and operatively associated with said second core piston to actuate an external alarm means in response to axial movement of said second core piston and second pressure bearing piston.

2. A control device as claimed in claim 1 wherein said switch means includes an actuator rod (24), a switch operating piston (11) being secured to said second pressure bearing piston to actuate the actuator rod in response to axial movement of said second core piston and second pressure bearing piston.

3. A control device as claimed in claim 2 wherein said switch operating piston has an annular groove (25) receiving said actuator rod.

4. A control device as claimed in claim 1 wherein said valve means comprises a spring-loaded ball (16).

* * * * *